United States Patent [19]
Krutchen

[11] 3,852,235

[45] Dec. 3, 1974

[54] MELT EXTRUDABLE POLYACETYLENE COPOLYMER BLENDS

[75] Inventor: Charles M. Krutchen, Elnora, N.Y.

[73] Assignee: General Electric Company, Schenectady, N.Y.

[22] Filed: Apr. 20, 1973

[21] Appl. No.: 352,923

Related U.S. Application Data

[63] Continuation-in-part of Ser. No. 86,280, Nov. 2, 1970, abandoned.

[52] U.S. Cl. .................. 260/32.4, 260/33.6 UA, 260/33.8 UA, 260/94.1, 423/447
[51] Int. Cl.... C08f 45/28, C08f 19/20, C01b 31/07
[58] Field of Search......... 260/47 UA, 88.2 D, 94.1, 260/613 R, 33.6 UA, 32.4

[56] References Cited
UNITED STATES PATENTS

| | | | |
|---|---|---|---|
| 3,051,693 | 8/1962 | Leto | 260/88.2 D |
| 3,097,195 | 7/1963 | Kennerly et al. | 260/88.2 D |
| 3,300,456 | 1/1967 | Hay | 260/88.2 D |

FOREIGN PATENTS OR APPLICATIONS

| | | |
|---|---|---|
| 1,149,697 | 4/1969 | Great Britain |

*Primary Examiner*—Morris Liebman
*Assistant Examiner*—T. DeBenedictis, Sr.
*Attorney, Agent, or Firm*—William A. Teoli; Joseph J. Cohen; Jerome C. Squillaro

[57] ABSTRACT

A method of making polyacetylene extrudate is described involving the extrusion of a mixture of a polyacetylene and an organic solvent. The resulting extrudate can be heat treated to form carbonaceous products. The polyacetylene extrudate experiences an increase in strength to weight ratio upon heating to elevated temperatures. It is convertible to the high strength graphitized state.

2 Claims, No Drawings

MELT EXTRUDABLE POLYACETYLENE COPOLYMER BLENDS

This application is a continuation-in-part of my copending application, Ser. No. 86,280 filed Nov. 2, 1970, and assigned to the same assignee as the present invention and now abandoned. All subject matter deleted from Ser. No. 86,280 is incorporated herein by reference.

The present invention relates to a method for making polyacetylene extrudate and to products derived therefrom.

Temperature resistant, flexible textile materials are constantly being sought for industrial applications such as for making fabrics for gas and liquid filtration, drier felts, furnace felt liners, ironing aprons, laundry press clothes, hoses, laminates, protective clothing, etc. Prior to the present invention, a variety of fibers were employed for the aforementioned industrial applications including cotton, nylon, acrylics, polyesters, etc. Although many of these fibers possess high temperature properties, some such as cotton, acrylics, etc., do not retain high strength to weight ratio at temperatures above 350°F. As a result, fibers are constantly being sought for applications requiring structural integrity at elevated temperatures over an extended period of time.

As taught by Hay U.S. Pat. No. 3,300,456 assigned to the same assignee as the present invention, polyacetylenes can be made by the oxidative coupling of diethynyl organo compounds. These polymers potentially represent an ideal material for the production of fibers as they can contain over 96 percent by weight of carbon. A serious obstacle in converting these materials to other than films is that they exhibit low solubility in organic solvents and can explosively decompose on heating. Those skilled in the art know that conventional solution spinning or melt techniques ordinarily employed to produce conventional polymeric organic fibers can not be resorted to when working with polyacetylenes. For example, in conventional solution spinning, polymeric solution of the order of 15 to 30 percent solids having stable properties for several hours are often required. Polyacetylenes, however, even at concentration of as low as 5 percent are stable at best for only a few minutes. In order to maintain the polyacetylene in solution at even such low concentrations, a temperature of 100°C or above must be employed. Direct melt extrusion is also out of the question, since before the polyacetylene can be melted, it will explode leaving behind a carbon residue. In particular instances where the preparation of fibers from solutions were attempted, the low solids concentration precluded exploratory opportunities for experimental evaluation of resulting materials.

A further problem with polyacetylenes resulting from organic solvent incompatibility is that low molecular weight polymer can result. Molecular weight build-up, for example, can be retarded by premature separation of insoluble polymer from the polymerization mixture. Those skilled in the art know that fibers prepared from solutions of low molecular weight polymer generally have limited utility.

The present invention is based on my discovery that contrary to the expectations of the art, polyacetylenes can be converted to a useful extrudate by the melt extrusion of a blend of polyacetylene and an organic solvent. The polyacetylenes are rendered extrudable on conventional melt extrusion equipment into extrudates of integrity and strength. The resulting extrudate can thereafter be converted by a simple heat treatment to temperatures up to 1,000°C to produce precursor filaments from which high strength, high modulus graphite can be made. The aforesaid graphite precursor, if desired, also can be used on applications where reinforcing fibers of integrity are required. In addition, the polyacetylene extrudate having a diameter of from about 0.3 to 50 mils in the form of a filament, or in the form of a ribbon or sheet, having an aspect ratio of from 4 to 2,000 based on the relation of $W/T$, where $W$ is width and $T$ is thickness can be fabricated into a variety of articles. The extrudate moreover experiences an increase in strength to weight ratio at temperatures up to as high as 3,300°C.

There is provided by the present invention, polyacetylene blends which are melt extrudable at temperatures of from 100°C to 180°C, and preferably 120°C to 150°C, comprising by weight (A) from 20 to 50 percent by weight of polyacetylene having an intrinsic viscosity of 0.5 to 1.5 in ortho-dichlorobenzene at 120°C, and (B) from 80 to 50 percent of organic solvent where said blends can be in the form of a free flowing powder, a wet granulated mixture or paste.

In preparing the above melt extrudable polyacetylene blends, blending of a polyacetylene and the organic solvent, which hereinafter also can be referred to as organic plasticizer, is preferably conducted at room temperature. Caution must be exercised during the early part of the blending operation because dry polyacetylene powder is unstable and can decompose if ignited by a static spark or a source of heat greater than 200°C. The blending of the polyacetylene and the organic plasticizer can be conveniently conducted on a small scale using a mortar and pestle, if desired. Blending also can be achieved with a Patterson-Kelly V-blender, Henschel Mill, or other conventional blending equipment. Depending upon such factors as the choice of polyacetylene, organic plasticizer, or respective amounts thereof, the resulting blend can be in the form of a free flowing powder, wet granular mixture or paste. It also has been found that once the blend is made, it is quite stable at room temperature and does not retain the unstable characteristics of polyacetylenes. However, it may burn quietly if ignited by a flame source. Blending is preferably done immediately prior to melt extruding the polyacetylene to avoid excessive separation of plasticizer from polyacetylene.

Organic solvents or plasticizers, which can be employed in combination with the polyacetylene to produce melt extrudable blends in accordance with the practice of the invention, are any organic liquids which are inert to the polyacetylene, while functioning as a plasticizer during the extrusion. An organic solvent functions as a plasticizer within the meaning of the present invention as it facilitates the extrusion of the polyacetylene-plasticizer blend. Suitable plasticizers are, for example, para-dichlorobenzene, ortho-dichlorobenzene, nitrobenzene, halogenated aryl hydrocarbons, such as Aroclors having an average weight per cent of chlorine from about 12 to 75 percent based on total weight of halogen, carbon and hydrogen, etc.

In order to determine whether a polyacetylene can be satisfactorily extruded in accordance with the practice of the invention, a simple test can be employed with a Fisher-Johns Melting Point Apparatus. This device is shown in the Fisher Catalog 70 of the Fisher Scientific Company catalog, on page 40. The polyacetylene-organic plasticizer blend to be evaluated is placed between the two glass plates employed in the Fisher-Johns Melting Point Apparatus. The glass plates are then placed on a hot stage and heated to a temperature in the range between 100° to 150°C while a pressure of from about 100 psi to 1,000 psi is employed. If the sample between the two plates forms a clear melt, the mixture is extrudable. The extrusion of the blend can be achieved at the temperature at which the melt is formed. The formation of a clear, tough film upon cooling, generally indicates that the extrudate from the plasticized polyacetylene blend will have integrity and strength.

The polyacetylenes which can be employed in the practice of the invention to produce the melt extrudable blends are preferably selected from a. copolymers of 88 to 92 mole per cent of meta-diethynylbenzene (MDEB) units and 8 to 12 mole per cent of para-diethynylbenzene (PDEB) units.
b. terpolymers consisting essentially of
  i. 85 to 92 mole per cent of MDEB units,
  ii. 4 to 10 mole per cent of PDEB units,
  iii. 2 to 6 mole per cent of bisphenol dipropargyl ether units, where the sum of (i), (ii) and (iii) units in (b) is 100 mole per cent,
c. terpolymers consisting essentially of
  iv. 74 to 86 mole per cent of MDEB units
  v. 4 to 9 mole per cent of PDEB units,
  vi. 5 to 15 mole per cent of diethynylalkane units, where the sum of (iv), (v) and (vi) units in (c) is 100 mole per cent, and
(d) tetrapolymer consisting essentially of about 5 percent by weight of acetylene units, and 95 percent by weight of (b) or (c), based on the total weight of tetrapolymers.

The polyacetylene useful in making the melt extrudable blends of the present invention can be made by reaction ethynylarylene compounds, such as mixtures of MDEB with PDEB in combination with compounds such as dipropargyl ethers of dihydric phenols, such as HOROH where R can be selected from divalent $C_{(6-20)}$ aromatic radicals, —RXR— where X is selected from

$SO_2$, S, etc and $R^1$ is hydrogen or monovalent $C_{(1-10)}$ hydrocarbon radicals; diethynyl $C_{(2-8)}$ alkanes, such as 1,4 diethynyl butane, 1,6-diethynyl hexane, etc, and optionally with acetylene. The oxidative coupling reaction disclosed in Hay U.S. Pat. No. 3,300,456, assigned to the same assignee as the present invention can be employed. There is employed in the oxidative coupling reaction, which will be shown more specifically in the examples set forth later, a basic cupric amine complex and oxygen. A mixture, for example, a dihydric phenol can be employed with a diethynyl arylene mixture consisting, for example, of MDEB and PDEB and employed in an oxygeneated solution with an oxidative coupling catalyst such as cuprous chloride, N,N,N',N'-tetramethylethylenediamine with an appropriate organic solvent such as dichlorobenzene and pyridine. Recovery of the polyacetylene can be achieved by the addition of the reaction mixture to methanol containing a trace of hydrochloric acid. The resulting polyacetylene can thereafter be washed by conventional means with a solvent such as methanol and dried. When employing dipropargyl ether units in the reaction mixture, there is produced "ether terpolymers" while "alkane terpolymers" can be made by using diethynyl alkane compounds, etc. These preferred polyacetylene terpolymers and tetrapolymers are more particularly described in copending application of Dwain M. White, Ser. No. 330,497, filed Feb. 8, 1973, and assigned to the same assignee as the present invention.

Extrusion of the polyacetylenes-organic plasticizer blend can be accomplished with devices commonly used for the melt extrusion of linear polymers, e.g., screw extruders, injection molding machines, etc. The only precaution that need be taken is that residence times in the extrusion device, i.e., the time entering the device at room temperature to the time exiting the device at melt temperature be selected to minimize gelation. It is preferred to extrude the polyacetylene over a period of about 5 to 10 minutes or less.

In making extrudate suitable for the production of carbon fiber and graphite fiber, orifices of from 3 to 100 mils may be used in conjunction with the extrusion device. While the polyacetylene is being extruded, a suitable fiber tension can be imposed on the extrudate to "melt-draw" the fiber down to diameters less than that of the die orifice from which the filament is spun. In accordance with standard spinning techniques, the diameter of the resulting filament may be controlled by the rate of polymer delivery from the die and the speed of a take-up reel to which the filament is fed after it is solidified.

The solidification of the extrudate may be accomplished in various ways such as cooling to room temperature by either air, water or other heat transfer agents. The plasticizer also can be extracted by the use of a suitable solvent such as methanol. Upon cooling the extrudate, the product can be treated as a polyacetylene fiber of uniform diameter and sufficient strength and integrity for further handling and processing. Caution should be exercised in handling the fiber at this point, particularly if the plasticizer has been removed for the dry filament may be ignited by a spark or temperatures greater than 200°C. The fiber can burn like a fuse if ignited even in an inert atmosphere or in vacuum.

It has been found that polyacetylene extrudate can be heat stabilized to produce a precursor of high strength, high modulus graphite fibers in a time period orders of magnitude faster than other known organic fibers. For example, a polyacetylene extrudate made according to the practice of the invention have a 1 mil diameter can be heat stabilized by exposure to temperatures up to 300°C in a total time of less than 1 minute. In addition, the extrudate can be fed under tension directly through a heating zone at temperatures up to about 500°C to simultaneously effect the removal of plasticizer and heat stabilization of the polymer. The heat stabilized extrudate can be subsequently converted to a high strength, high modulus graphite fiber having a tensile strength of 330,000 psi and an elastic modulus of $56 \times 10^6$ psi.

Heat stabilization of the extrudate can be achieved at temperatures up to about 1,000°C for a time sufficient to increase the modulus of elasticity of the extrudate to about $1 \times 10^6$ psi. The polyacetylene extrudate, for example, can have an initial elastic modulus of from about 1,000 psi to about 10,000 psi. The heat stabilized extrudate can have an elastic modulus of from about $1 \times 10^6$ psi to about $10 \times 10^6$ psi. Stabilization of the extrudate is believed to relate to a control of the rearrangement of acetylenic radicals. Control is accomplished by either (1) low temperature (100°–200°C) heat treatment for long periods of time, (2) sequential treatments at increasing temperatures for shorter periods of time, or (3) flash exposure of extrudate to temperatures up to about 1,000°C. For example, heat stabilization of a 1 mil polyacetylene extrudate can be achieved by 16 hours exposure at 160°C or passage over a hot pin at 310°C for about 0.5 seconds and then through ovens at 200°C and 300°C for 20 seconds. These heat treatments can be conducted either in the presence or absence of oxygen, i.e., air, vacuum or in an inert gas atmosphere, such as argon or nitrogen.

When stabilized according to the present invention, a carbonaceous product can be made having a tensile strength of from about 30,000 to about 100,000 psi, and an elastic modulus of from about $1 \times 10^6$ to $10 \times 10^6$ psi. Because it can be carbonized at temperatures up to 3,300°C, the extrudate can experience an increase in modulus without a decrease in tensile strength, when heated to temperatures up to about 3,300°C. If carbonization of the extrudate is achieved without loading, a carbonaceous product can be made having a tensile strength of up to about 50,000 to 150,000 psi and an elastic modulus of up to about $10 \times 10^6$ psi.

There is also provided by the present invention a method for making carbonaceous products which comprise (1) extruding polyacetylene at a temperature in the range of up to about 180°C, (2) exposing the extruded polyacetylene to a temperature of up to about 1,000°C to produce a carbonaceous product having a tensile strength of up to $15 \times 10^4$ psi and an elastic modulus greater than the extrudate of (1) and up to about $10 \times 10^6$ psi.

As taught in copending application, Sliva, et al, (RD-6528), graphitization of the polyacetylene extrudate can be achieved by advancing the heat stabilized extrudate while under tension, to a temperature in the range of from 2,000°C to 3,300°C. A tension of from about 3,000 psi to about $1 \times 10^5$ psi, and preferably 10,000 psi to 15,000 psi can be employed. Depending on the temperature employed during graphitization, the residence time of the stabilized extrudate in the heating zone can vary from about 15 seconds or less, to 360 seconds or more. During the graphitization step, extrudate can be elongated up to 100 percent or more. As a result of the stress graphitization, a graphite filament or ribbon can be obtained which can have a tensile strength of 25,000 psi or more, a tensile modulus of $20 \times 10^6$ psi or more, and a density of 1.5 to 2.0 gm/cm³.

The polyacetylene extrudate can be woven to make B-stage carbon fabrics. The resulting woven product thereafter can be carbonized. The polyacetylene extrudate and products made therefrom in accordance with the subject invention, also can be utilized in combination with organic resins, such as epoxy, polyimides, etc. to produce structural composite materials.

In order that those skilled in the art will be better able to practice the invention, the following examples are given by way of illustration and not by way of limitation. All parts are by weight.

EXAMPLE 1

A polyacetylene copolymer is prepared utilizing a mixture of meta-diethynylbenzene (MDEB) and para-diethynylbenzene (PDEB). Copolymerization is achieved by oxidative coupling utilizing as a catalyst a mixture of cuprous chloride, N,N,N',N'-tetramethylethylenediamine and a solvent system of dichlorobenzene and pyridine. There is obtained a polyacetylene having about 88 mole per cent of MDEB units and about 12 mole per cent of PDEB units (copolymer A). Another polyacetylene also is prepared having about 75 mole per cent of MDEB and 25 mole per cent of PDEB (copolymer B).

Solvent compatibility of copolymer A and B is determined by attempting to form a 2 percent solution of the respective polyacetylenes in ortho-dichlorobenzene at temperatures of about 110°C. An initial mixture is respectively made at 2 percent copolymer solids in a small vial. The temperature of the vial is rapidly elevated by placing it in a large preheated bath. If the copolymer dissolves, it is allowed to cool slowly to determine the haze temperature, i.e., the temperature at which the copolymer first separates. It is found that polyacetylene A having 12 mole per cent of PDEB units and 88 mole per cent of MDEB units has a haze temperature of 45°C; copolymer B remains partially insoluble even at temperatures as high as 150°C.

A blend of copolymer A is prepared utilizing about two parts of ortho-dichlorobenzene per part of polymer. The blend is made by milling the polyacetylene with a mortar and pestle at ambient temperatures. The blend in the form of a free flowing granular mixture is charged to an extruder at 135°C. After a few seconds, it is extruded through a 5 mil orifice to produce an extrudate having a diameter of 2.8 mil and an elastic modulus of about 2,000 psi.

The extrudate is drawn over a hot pin at 185°C to a diameter of 1 mil and collected at a rate of 55 feet per minute under atmospheric conditions.

The polyacetylene extrudate is then heat treated by passing the drawn filament over 10 inch long hot shoes at 260°C, and then at 360°C, at a rate of about 6 feet per minute under atmospheric conditions. The resulting heat treated extrudate is found to have an elastic modulus of about $2.5 \times 10^6$ psi.

EXAMPLE 2

A portion of the extrudate from Example 1 is cut to produce 20 fibers having an average length of 6 inches. Half of the extrudate are layed parallel to each other on a refractory surface as warp thread and the remaining fibers are wound back and forth across the warp thread as filling. The extrudate is then heated for 24 hours at 165°C followed by 1,000°C oven treatment for 30 minutes. There is obtained an integral carbon fabric useful for reinforcing epoxy resin to produce a composite having valuable characteristics.

EXAMPLE 3

A copolymer of 2 parts MDEB and one part PDEB was prepared by the oxidative coupling as described by Example 1. A wet granular blend is prepared of 2 parts of copolymer and 8 parts of ortho-dichlorobenzene. A small quantity of the blend was tested with the Fisher-Johns Melting Point Apparatus and found to go into a clear film between the two glass plates at 160°C. The remainder of the blend was then extruded from a piston-loaded, heated cylinder at 160°C through a 10-mil die. The extrudate was cooled by dropping 6 feet through room temperature air to a tray. This coagulated the fiber sufficiently that it could subsequently be backwound and was found to have integrity and strength.

EXAMPLE 4

A terpolymer was made by employing dipropargyl ether of 2,2-bis(4-hydroxyphenyl)propane (bisphenol-A) (BPA), MDEB and PDEB utilizing an oxidative coupling catalyst produced with cuprous chloride, N,N,N',N'-tetramethylethylenediamine, and a solvent system of pyridine and dichlorobenzene.

There was added a solution in about 25 parts of dichlorobenzene of 0.5 part of the dipropargyl ether of BPA, 4.1 parts of MDEB, and 0.4 part of PDEB to a mixture of 0.15 part of cuprous chloride, about 0.18 part of N,N,N',N'-tetramethylethylenediamine dissolved in an oxygenated solution of about 1.7 parts of pyridine and 75 parts of ortho-dichlorobenzene at 60°C. The temperature of the mixture rose to 88.5°C while it was stirred after about 2 minutes. The mixture also became too thick to stir. After 10 minutes the mixture was allowed to cool to room temperature, and added to excess methanol containing a trace of hydrochloric acid. There was obtained a quantitative yield of product having an intrinsic viscosity of ortho-dichlorobenzene at 120°C of 0.77 dl/g. Based on method of preparation, the product was a polyacetylene terpolymer having about 4 mole per cent dipropargyl bisphenol-A ether units, 9 mole per cent of PDEB units and 87 mole per cent of MDEB units.

Compatibility of the terpolymer was determined by the above described haze test. It was found to be compatible since its haze temperature was about 38°C. It also was found that the terpolymer resulted in less than 7 percent loss by weight of carbon values based on the theoretical weight per cent of carbon, when the terpolymer was subsequently graphitized in fibrous form.

A blend was prepared consisting of about 2 parts of ortho-dichlorobenzene and 1 part of the above terpolymer. The blend was heated to a plastic state at 125°C and extruded through a 3 mil die hole. The extrudate was allowed to fall freely about 4 feet onto a paper substrate. The extrudate was found to have a diameter of about 2½ to 3 mils and tensile modulus of about 2,000 psi. The extrudate was drawn 450 per cent by passing it over a 0.25 inch diameter hot pin maintained at 125°C and protected with a nitrogen atmosphere. The extrudate was collected at a rate of about 55 feet per minute. The extrudate was then passed over the hot pin at temperatures of 310°C protected with nitrogen at a take-up rate of 2 feet per minute. The extrudate was further passed twice through a heating zone at 200°C at a rate of 6 feet per minute under a load of 1 gram. The filament was then passed twice through a 300°C heating zone utilizing a nitrogen atmosphere at a rate of 6 feet per minute under a load of 1 gram. The resulting polyacetylene extrudate was 1.0 to 1.25 mils in diameter and had a tensile strength of 30,000 psi to 60,000 psi, and an elastic modulus of $2.5 \times 10^6$ psi. Elemental analysis showed it contained about 88 per cent carbon.

The above extrudate was then loaded to a stress level of 4,000 to 14,000 psi and then passed through an argon atmosphere at temperatures in the range of from about 2,500° to 3,000°C in an induction furnace. A residence time of the extrudate in the heating zone while under stress in an argon atmosphere was about 6 minutes. There was obtained a carbon fiber having a tensile strength of $330 \times 10^3$ psi and an elastic modulus of $56 \times 10^6$. The density of the fiber was found to be about 2.0 grams per cubic centimeter.

EXAMPLE 5

A solution of 0.5 part of 1,7-octadiyne, 4.2 parts of MDEB and 0.3 part of PDEB in 25 parts of ortho-dichlorobenzene was added to a solution of 0.15 part of cuprous chloride, about 0.23 part of N,N,N',N'-tetremethyl-1,2-ethylene diamine and about 1.7 parts of pyridine, in about 75 parts of ortho-dichlorobenzene, which was being oxygenated and stirred at 62½°C. The temperature of the mixture rose to about 88°C within 2 minutes and then gradually dropped. The mixture was stirred for 60 minutes and then poured into about 500 parts of methanol containing a trace of hydrochloric acid. The product which precipitated was collected on a filter and washed with additional methanol and dried at 25°C. There was obtained a 99 percent yield of product having an intrinsic viscosity of 0.50 dl/g at 120°C. Based on method of preparation, the product was polyacetylene terpolymer composed essentially of 12 mole per cent of octadiynyl units, 82 mole per cent of MDEB units, and 6 mole per cent of PDEB units.

Several additional alkylene terpolymers were made following the same procedure to determine the optimum mole per cent ranges of ethynyl units for plasticizer compatibility was determined in ortho-dichlorobenzene using the haze test. It was found that optimum compatibility in ortho-dichlorobenzene was a terpolymer having 15 mole per cent of alkane diethynyl units, 76 mole per cent of MDEB units, and 8 mole per cent of PDEB units.

Free flowing powdery blends are prepared from the above terpolymers with ortho-dichlorobenzene using the procedure of Example 1. The blends are extruded and graphitized. High strength graphite is obtained useful for making composites.

EXAMPLE 6

There was added a solution of 4.23 parts of MDEB, 0.27 part of PDEB, 0.50 part of the dipropargyl ether of BPA in ortho-dichlorobenzene to an oxygenated mixture of 0.15 part of cuprous chloride, 0.17 part of tetramethylethylenediamine, about 1.7 part of pyridine, and approximately 60 parts of ortho-dichlorobenzene. Oxygenation of the mixture was achieved by bubbling oxygen into the solvent at a rate of about 0.5 cubic feet per hour, per mole of ethynyl compound. There was then bubbled into a mixture 0.28 part of acetylene over a 2 minute period. The reaction temperature rose steadily from an initial bath temperature of about 61°C to about 80.5°C, and then gradually dropped. External heating was removed after about 6 minutes, after which time the oxygenation of the mixture was discontinued. The product began to precipitate upon cooling. The mixture was added to excess methanol acidified with hydrochloric acid to effect the precipitation of product. Recovery of the product was achieved by a standard extraction technique, followed by washing with methanol. Based on method of preparation, the product was a polyacetylene having about 95 percent by weight of diethynyl units consisting of 4 mole per cent of chemically combined dipropargyl bisphenol-A ether units, 9 mole per cent of PDEB units, 87 mole per cent of MDEB units, and about 5 per cent by weight of additional acetylene units based on the weight of polyacetylene. The product had an intrinsic viscosity of dichlorobenzene at 120°C of 1.12 dl/g. It did not precipitate from a 2 percent solution in ortho-dichlorobenzene until cooled to 30°C.

The above polyacetylene tetrapolymer is blended with nitrobenzene to produce a mixture having up to 50 percent by weight solvent. It is extruded through a 30 mil die at 135°C. The resulting extrudate is used to make high strength graphite.

Although the above examples are limited to only a few of the very many polyacetylene blends, polyacetylene extrudate, heat stabilized polyacetylene extrudate, etc., and method for making such materials, it should be understood that a wide variety of polyacetylenes and organic plasticizers can be used in the description preceding the examples.

What I claim as new and desire to secure by Letters Patent of the United States:

1. Polyacetylene blends which are melt extrudable at temperatures of from 100° to 180°C, comprising by weight (A) from 20 to 50 percent by weight of polyacetylene having an intrinsic viscosity of 0.5 to 1.5 in ortho-dichlorobenzene at 120°C in the form of a copolymer consisting essentially of from 80–92 mole percent of metadiethynylbenzene units and 8–12 mole percent of paradiethynylbenzene units, and (B) from 80 to 50 percent of organic solvent selected from the class consisting of para-dichlorobenzene, ortho-dichlorobenzene, nitrobenzene and halogenated aryl hydrocarbons having an average weight percent of chlorine from about 12–75 percent based on the total weight of halogen, carbon and hydrogen, where said blends can be in the form of a free flowing powder, a wet granulated mixture or paste.

2. A blend in accordance with claim 1, where the polyacetylene is a terpolymer consisting essentially of i. 85 to 92 mole per cent of meta-diethynylbenzene units,
ii. 4 to 10 mole per cent of para-diethynylbenzene units,
iii. 2 to 6 mole per cent of bisphenol dipropargyl ether units, where the sum of (i), (ii) and (iii) units are 100 mole per cent.

* * * * *